United States Patent
Salter et al.

(10) Patent No.: US 12,191,699 B2
(45) Date of Patent: Jan. 7, 2025

(54) SYSTEMS AND METHODS FOR CONTROLLING POWER FLOW BETWEEN ELECTRIFIED VEHICLES AND CHARGING TRAILERS BASED ON MANUALLY SELECTED CHARGE PRIORITY LEVELS

(71) Applicant: FORD GLOBAL TECHNOLOGIES, LLC, Dearborn, MI (US)

(72) Inventors: Stuart C. Salter, White Lake, MI (US); Ryan O'Gorman, Beverly Hills, MI (US); William David Treharne, Ypsilanti, MI (US); Lorne Forsythe, Novi, MI (US); Peter Phung, Windsor (CA); William Wurz, San Francisco, CA (US); Clive McKenzie, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 545 days.

(21) Appl. No.: 17/590,374

(22) Filed: Feb. 1, 2022

(65) Prior Publication Data

US 2023/0246471 A1 Aug. 3, 2023

(51) Int. Cl.
*H02J 7/00* (2006.01)
*B60L 50/60* (2019.01)
*B60L 53/30* (2019.01)
*B60L 53/66* (2019.01)
*B60L 53/67* (2019.01)

(52) U.S. Cl.
CPC ........ *H02J 7/007188* (2020.01); *B60L 50/60* (2019.02); *B60L 53/305* (2019.02); *B60L 53/66* (2019.02); *B60L 53/67* (2019.02); *H02J 7/00032* (2020.01); *H02J 2310/48* (2020.01)

(58) Field of Classification Search
CPC .................................................. H02J 7/007188
USPC ......................................................... 320/109
See application file for complete search history.

(56) References Cited

U.S. PATENT DOCUMENTS

| | | | |
|---|---|---|---|
| 9,321,357 B2 | 4/2016 | Caldeira et al. | |
| 2013/0257144 A1* | 10/2013 | Caldeira | B60L 58/20 307/9.1 |
| 2013/0257145 A1* | 10/2013 | Caldeira | B60L 50/61 307/9.1 |
| 2019/0359198 A1* | 11/2019 | Velderman | B60L 53/30 |
| 2020/0231057 A1* | 7/2020 | Hishida | H02J 13/00006 |
| 2020/0324665 A1* | 10/2020 | Mackenzie | B60L 53/22 |
| 2021/0070138 A1* | 3/2021 | Schumacher | H02J 7/35 |

(Continued)

FOREIGN PATENT DOCUMENTS

JP 2013184584 A 9/2013

*Primary Examiner* — Jerry D Robbins
(74) *Attorney, Agent, or Firm* — David B. Kelley; Carlson, Gaskey & Olds, P.C.

(57) ABSTRACT

Systems and methods are provided for coordinating and controlling power flow during bidirectional energy transfer events between an electrified vehicle and one or more charging trailers. The systems and methods may prioritize energy transfers between each connected energy based on a charge priority selection that may be manually input by a user of the system. Charge energy may be transferred to the appropriate energy unit using such a manual approach to meet customer needs with varying levels of priority according to an energy transfer prioritization control strategy that is derived from various inputs that are considered.

20 Claims, 7 Drawing Sheets

(56) References Cited

U.S. PATENT DOCUMENTS

| | | | |
|---|---|---|---|
| 2023/0096878 A1* | 3/2023 | Thomason | B60L 53/18 320/109 |
| 2023/0104277 A1* | 4/2023 | Christen | B60K 6/48 701/22 |
| 2023/0108029 A1* | 4/2023 | Salter | B60K 1/04 320/109 |
| 2023/0145383 A1* | 5/2023 | Salter | B60L 53/65 |
| 2023/0246467 A1* | 8/2023 | Salter | B60L 58/14 320/109 |
| 2024/0042861 A1* | 2/2024 | Mergener | H02J 7/0042 |
| 2024/0067005 A1* | 2/2024 | Javidan | B60L 53/38 |

* cited by examiner

SYSTEMS AND METHODS FOR CONTROLLING POWER FLOW BETWEEN ELECTRIFIED VEHICLES AND CHARGING TRAILERS BASED ON MANUALLY SELECTED CHARGE PRIORITY LEVELS

TECHNICAL FIELD

This disclosure relates generally to systems and methods for providing prioritized bidirectional energy transfers between charging trailers and electrified vehicles.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Plug-in type electrified vehicles include one or more charging interfaces for charging the traction battery pack. Plug-in type electrified vehicles are most commonly charged while parked at a charging station or some other utility power source.

SUMMARY

A bidirectional energy transfer system according to an exemplary aspect of the present disclosure includes, among other things, an electrified vehicle, a charging trailer operably coupled to the electrified vehicle, and a control module programmed to execute an energy transfer prioritization control strategy for controlling a transfer of energy between the electrified vehicle and the charging trailer during an energy transfer event. The energy transfer prioritization control strategy is derived based on a charge priority selection that is manually input by a user of the system.

In a further non-limiting embodiment of the foregoing system, an electrified recreational/industrial vehicle is operably coupled to the charging trailer.

In a further non-limiting embodiment of either of the foregoing systems, the control module is further programmed to control a transfer of energy from at least one of the charging trailer or the electrified vehicle to the electrified recreational/industrial vehicle during the energy transfer event.

In a further non-limiting embodiment of any of the foregoing systems, the control module is further programmed to control a transfer of energy from at least one of the charging trailer or the electrified recreational/industrial vehicle to the electrified vehicle during the energy transfer event.

In a further non-limiting embodiment of any of the foregoing systems, the control module is further programmed to interface with a bidirectional power transfer system of the electrified vehicle for controlling the transfer of the energy between the charging trailer and the electrified vehicle according to the energy transfer prioritization control strategy.

In a further non-limiting embodiment of any of the foregoing systems, the control module is a component of the electrified vehicle or a cloud-based server system.

In a further non-limiting embodiment of any of the foregoing systems, a user interface is adapted to receive a user input of the charge priority selection from the user.

In a further non-limiting embodiment of any of the foregoing systems, the user interface is presentable on a human machine interface or a personal electronic device that is associated with the system.

In a further non-limiting embodiment of any of the foregoing systems, the control module is further programmed to command a notification to the user when the system is unable to transfer the energy in the manner indicated by the energy transfer prioritization control strategy.

In a further non-limiting embodiment of any of the foregoing systems, the notification is presented on a user interface of a human machine interface or a personal electronic device associated with the system.

An electrified vehicle according to another exemplary aspect of the present disclosure includes, among other things, a traction battery pack, and a control module programmed to execute an energy transfer prioritization control strategy for controlling a transfer of energy from the traction battery pack to a separate energy unit or from the separate energy unit to the traction battery pack during an energy transfer event. The energy transfer prioritization control strategy is derived based on a charge priority selection that is manually input by a user of the electrified vehicle.

In a further non-limiting embodiment of the foregoing electrified vehicle system, the charge priority selection indicates a desired order of charge priority when transferring the energy to/from the traction battery pack.

In a further non-limiting embodiment of either of the foregoing electrified vehicle systems, the control module is further programmed to interface with a bidirectional power transfer system for controlling the transfer of the energy to/from the traction battery pack.

In a further non-limiting embodiment of any of the foregoing electrified vehicle systems, the separate energy unit is a component of a charging trailer.

In a further non-limiting embodiment of any of the foregoing electrified vehicle systems, the separate energy unit is a component of an electrified recreational/industrial vehicle.

In a further non-limiting embodiment of any of the foregoing electrified vehicle systems, a human machine interface is configured via a user interface to allow the user to manually input the charge priority selection.

In a further non-limiting embodiment of any of the foregoing electrified vehicle systems, the user interface includes a plurality of tiles that are configured to be manipulated to reorder a priority ranking of the traction battery pack and the separate energy unit.

In a further non-limiting embodiment of any of the foregoing electrified vehicle systems, a telecommunications module is configured to wirelessly communicate with the separate energy unit.

In a further non-limiting embodiment of any of the foregoing electrified vehicle systems, the control module is further programmed to prompt the user to input the charge priority selection in anticipation of the energy transfer event.

In a further non-limiting embodiment of any of the foregoing electrified vehicle systems, the control module is further programmed to receive an input from the user indicating that the charge priority selection has been manually input.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and controlling power flow during bidirectional energy transfer events between an electrified vehicle and one or more charging trailers. The systems and methods may prioritize energy transfers between each connected energy unit based on a charge priority selection that may be manually input by a user. Charge energy may be transferred to the appropriate energy unit using such a manual approach to meet customer needs with varying levels of priority according to an energy transfer prioritization control strategy that is derived from various inputs that are considered. These and other features of this disclosure are discussed in greater detail in the following paragraphs of this detailed description.

Figure 1:
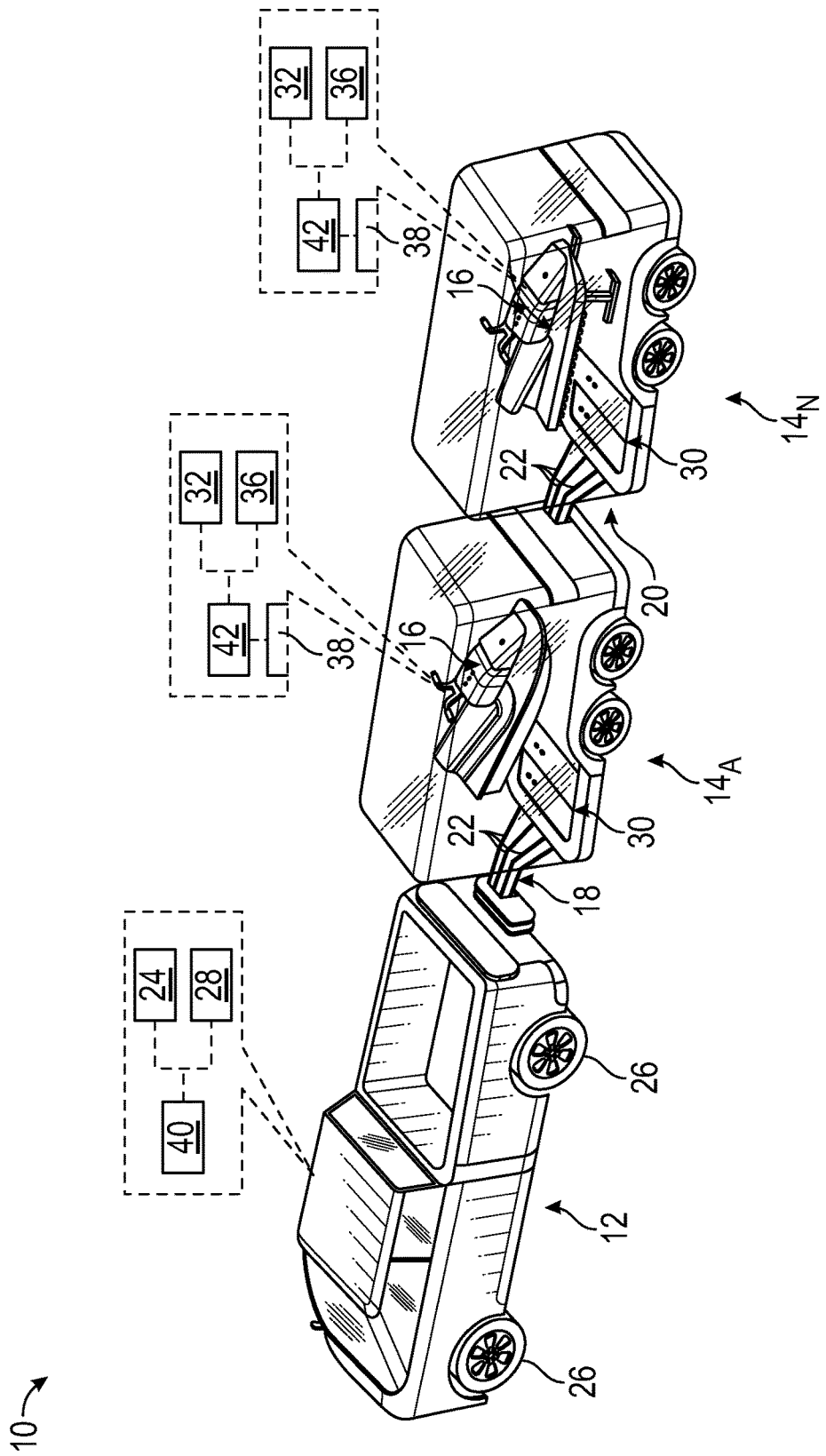
FIG. 1 schematically illustrates a bidirectional energy transfer system configured for transferring energy between an electrified vehicle and one or more charging trailers.

FIG. 1 schematically illustrates an exemplary bidirectional energy transfer system 10 (hereinafter "the system 10") for bidirectionally transferring energy between multiple electrified units. In particular, the system 10 may be utilized for controlling the power flow between a towing or leading electrified vehicle 12 and one or more charging trailers $14_A$ to $14_N$, where "N" represents any number. The charging trailers 14 may be operably connected in series to the electrified vehicle 12. Unless stated otherwise herein, reference numeral "14" may refer to any of the charging trailers when used without any alphabetic identifier immediately following the reference numeral.

Energy may be bidirectionally transferred between the electrified vehicle 12 and the one or more charging trailers 14 either while the structures are stationary or during "in-flight" events. In this disclosure, the term "in-flight" means during the coupled movement of the electrified vehicle 12 and the one or more charging trailers 14, such as when the electrified vehicle 12 is hauling or towing the one or more charging trailers 14. Accordingly, the system 10 is capable of effectively managing the bidirectional transfer of energy from the electrified vehicle 12 to the one or more charging trailers 14 or vice-versa while the respective electrified units are making forward progress toward a desired destination/waypoint.

The charging trailers 14 may be coupled to the electrified vehicle 12 in a daisy-chain configuration. For example, a first towing device 18 may releasably couple the charging trailer $14_A$ to the electrified vehicle 12, a second towing device 20 may releasably couple the charging trailer $14_N$ to the charging trailer $14_A$, and so on for enabling a towing event in which energy transfers between the various energy units can be executed. Each towing device 18, 20 may include electrical cabling 22 for enabling energy transfers between the various energy units of the system 10. The specific configuration of each towing device 18, 20 is not intended to limit this disclosure.

Each charging trailer 14 may optionally haul/store/house one or more electrified recreational/industrial vehicles 16. The system 10 may thus be configured for achieving bidirectional energy transfers between each of the electrified vehicle 12, the one or more charging trailers 14, and the one or more electrified recreational/industrial vehicles 16. Although one electrified vehicle 12, two charging trailers 14, and two electrified recreational/industrial vehicles 16 are illustrated as being part of the system 10 of FIG. 1, this disclosure is not limited to that specific configuration of the system 10.

The electrified vehicle 12 of FIG. 1 is schematically illustrated as a pickup truck. However, other electrified vehicle configurations are also contemplated. The teachings of this disclosure may be applicable for any type of vehicle as the electrified vehicle 12. For example, the electrified vehicle 12 could be configured as a car, a truck, a van, a sport utility vehicle (SUV), etc.

The electrified recreational/industrial vehicle 16 of the charging trailer $14_A$ is schematically illustrated as a personal watercraft, and the electrified recreational/industrial vehicle 16 of the charging trailer $14_N$ is schematically illustrated as a snowmobile. However, other recreational/industrial vehicle configurations are also contemplated. The teachings of this disclosure may be applicable for any type of recreational/industrial vehicle. For example, the one or more electrified recreational/industrial vehicles 16 could include any combination of all-terrain vehicles (ATV), utility vehicles (UTV), motorcycles, bikes, dirt bikes, snowmobiles, off-road vehicles, personal watercrafts, etc. Moreover, the term "electrified recreational/industrial vehicle" is inclusive of industrial/commercial equipment and related vehicles such as agricultural equipment (e.g., various tractors, backhoes, harvesters, drones, etc.) and/or construction equipment (e.g., towable light towers, skid-steer/compact track and various loaders, forklifts/telehandlers, mini excavators, boom/scissor and various lifts, carry deck cranes, trenchers, pavers, compactors, dozers, drum rollers, drones, etc.).

In an embodiment, the electrified vehicle 12 is a plug-in type electrified vehicle (e.g., a plug-in hybrid electric vehicle (PHEV) or a battery electric vehicle (BEV)). The electrified vehicle 12 may include an electrified powertrain capable of applying a torque from an electric machine 24 (e.g., an electric motor) for driving one or more drive wheels 26 of the electrified vehicle 12. The electrified vehicle 12 may include a traction battery pack 28 for powering the electric machine 24 and other electrical loads of the electrified vehicle 12. The powertrain of the electrified vehicle 12 may electrically propel the drive wheels 26 either with or without the assistance of an internal combustion engine.

In an embodiment, each charging trailer 14 may include an energy storage system 30 adapted for storing electrical energy that can be utilized to charge the electrified vehicle 12 and/or one or more of the electrified recreational/industrial vehicles 16. Each energy storage system 30 may include in an exemplary embodiment a battery bank having a plurality of interconnected battery cells capable of storing electrical energy. However, other types of energy storage devices are also contemplated within the scope of this disclosure.

In an embodiment, each electrified recreational/industrial vehicle 16 is an all-electric recreational/industrial vehicle having an electrified powertrain capable of applying torque from an electric machine 32 (e.g., an electric motor) for driving one or more drive devices (e.g., wheel, pump, etc.) of the electrified recreational/industrial vehicle 16. Each electrified recreational/industrial vehicle 16 may further include a traction battery pack 36 for powering the electric machine 32. The powertrain of each electrified recreational/industrial vehicle 16 may electrically propel the drive device without the assistance of an internal combustion engine.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

Although shown schematically, the traction battery pack 28 of the electrified vehicle 12 may be configured as a high voltage traction battery pack that includes a plurality of battery arrays (i.e., battery assemblies or groupings of battery cells) capable of outputting electrical power to the electric machine 24 of the electrified vehicle 12. Other types of energy storage devices and/or output devices may also be used to electrically power the electrified vehicle 12.

The traction battery pack 36 of each electrified recreational/industrial vehicle 16 may be a removable high voltage traction battery that includes a plurality of battery cells or groupings of battery cells. In an embodiment, each traction battery pack 36 is a removable traction battery that may be swapped out and replaced with another traction battery.

In some implementations, the traction battery pack 36 of each electrified recreational/industrial vehicle 16 is a smaller battery than the traction battery pack 28 of the electrified vehicle 12. However, both batteries are capable of supplying high voltage power for electrically propelling the electrified vehicle 12 or the respective electrified recreational/industrial vehicle 16. From time to time, the traction battery pack 28 and/or the traction battery pack 36 must be recharged to replenish their respective energy stores. As further discussed below, the system 10 may be configured to coordinate and control the exchange of charge energy between various energy units of the system 10.

The electrified vehicle 12 may additionally include a bidirectional power transfer system 40. The bidirectional power transfer system 40 may be configured for enabling the bidirectional transfer of power to/from the electrified vehicle 12. The electric machine 24 and the bidirectional power transfer system 40 may collectively be referred to as an electric power take-off of the electrified vehicle 12.

The bidirectional power transfer system 40 may be operably connected between the charging trailer 14$_A$ and the traction battery pack 28 of the electrified vehicle 12. The bidirectional power transfer system 40 may include various equipment, such as a charger, a DC-DC converter, HV relays or contactors, a motor controller (which may be referred to as an inverter system controller or ISC), etc., arranged and configured to establish the bidirectional transfer of electrical energy between the traction battery pack 28 and another energy source (e.g., the energy storage system 30 of any charging trailer 14 and/or the traction battery pack 36 of any electrified recreational/industrial vehicle 16). The bidirectional power transfer system 40 may additionally be configured to transfer energy between the traction battery pack 28 and the electric machine 24.

Each electrified recreational/industrial vehicle 16 may additionally include a bidirectional power transfer system 42. The bidirectional power transfer system 42 may be operably connected between a charging interface 38 and the traction battery pack 36 of the electrified recreational/industrial vehicle 16. Each electrified recreational/industrial vehicle 16 may interface with the energy storage system 30 of its respective charging trailer 14 through the charging interface 38 for transferring energy between the traction battery pack 36 and the energy storage system 30. The charging interface 38 may be either a wired interface or a wireless interface.

The bidirectional power transfer system 42 may include various equipment, such as a charger, a DC-DC converter, HV relays or contactors, a motor controller (which may be referred to as an inverter system controller or ISC), etc., arranged and configured to establish the bidirectional transfer of electrical energy between the traction battery pack 36 and another energy source (e.g., the energy storage system 30 of a respective charging trailer 14 and/or the traction battery pack 28 of the electrified vehicle 12). The bidirectional power transfer system 42 may additionally be configured to transfer energy between the traction battery pack 36 and the electric machine 32 of each electrified recreational/industrial vehicle 16.

One non-limiting example of a suitable bidirectional power transfer system that may be employed for use within the electrified vehicle 12 and/or the electrified recreational/industrial vehicles 16 for achieving bidirectional power transfers is disclosed within US Patent Publication No. 2020/0324665, assigned to Ford Global Technologies, LLC, the disclosure of which is incorporated by reference herein. However, other bidirectional power transfer systems could also be utilized for achieving the bidirectional transfers of power within the scope of this disclosure.

The system 10 may further be configured to provide "passthrough charging" such that charge energy from the charging trailer 14$_N$ and/or the electrified recreational/industrial vehicle 16 of the charging trailer 14$_N$ may be passed through the charging trailer 14$_A$ for charging the traction battery pack 28, or vice versa. In this disclosure, the term "passthrough charging" indicates the ability of an energy unit to transfer all or a portion of the power stored therein to another energy unit for addressing that unit's energy needs without the other unit being directly connected to the unit that is providing the charge energy.

Figure 2:
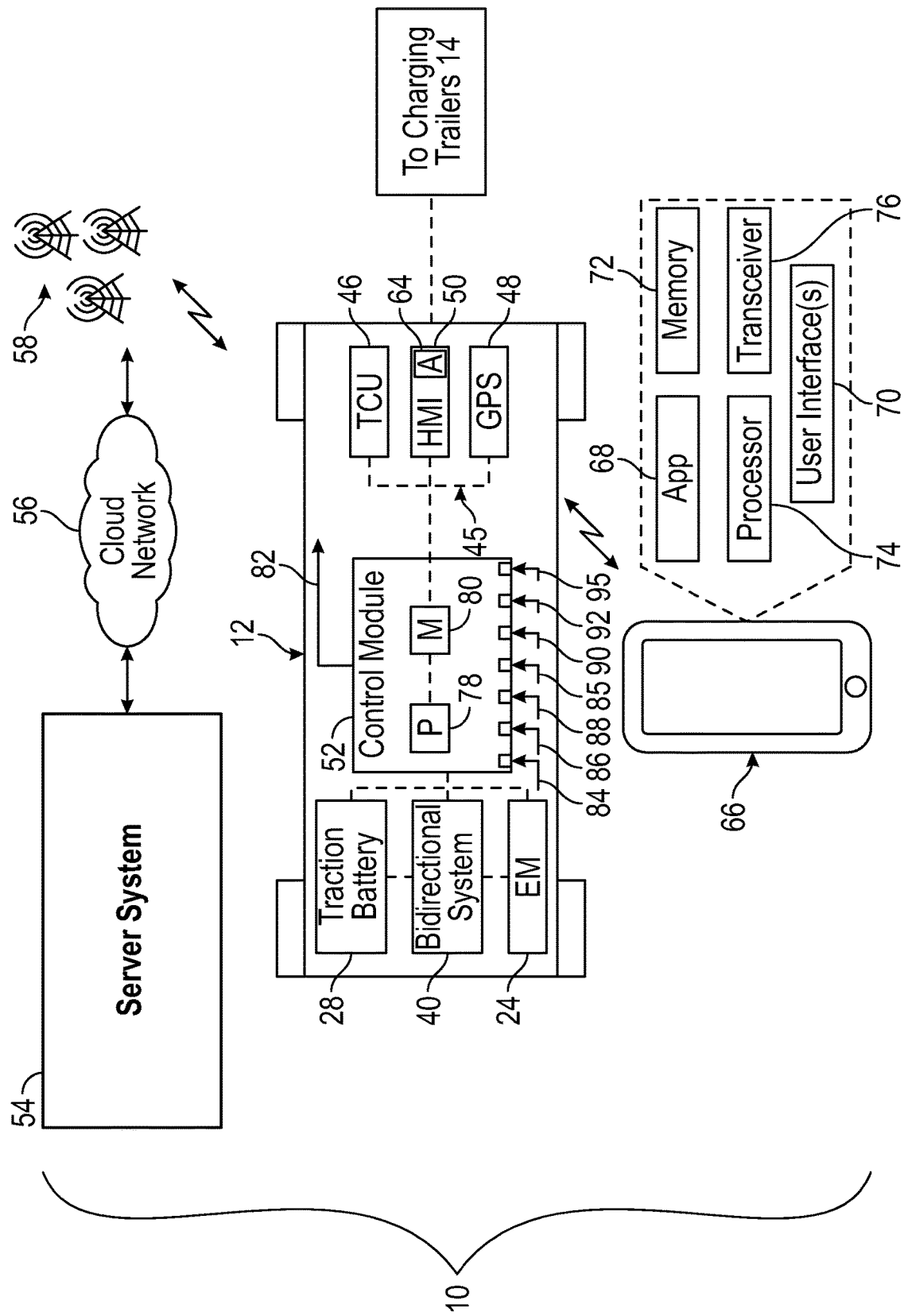
FIG. 2 schematically illustrates exemplary aspects of a bidirectional energy transfer system from the perspective of an electrified vehicle of the system.

Additional aspects of the system 10 of FIG. 1 are further detailed from the perspective of the electrified vehicle 12 in FIG. 2. In particular, FIG. 2 schematically illustrates features that enable the system 10 to coordinate and provide energy flow prioritization between the electrified vehicle 12 and one or more charging trailers 14 (and/or optionally one or more electrified recreational/industrial vehicles 16) based on an energy transfer prioritization control strategy that may be derived in response to a charge priority selection input by a user of the system 10. In this way, the system 10 may be equipped to manually manage energy transfers in order of priority between various electrified units.

As further part of the system 10, the electrified vehicle 12 may include a telecommunications module 46, a global positioning system (GPS) 48, a human machine interface (HMI) 50, and a control module 52. These and other components may be interconnected and in electronic communication with one another over a communication bus 45 of the electrified vehicle 12. The communication bus 45 may be a wired communication bus such as a controller area network (CAN) bus, or a wireless communication bus such as Wi-Fi, Bluetooth®, Ultra-Wide Band (UWB), etc.

The telecommunications module 46 may be configured for achieving bidirectional communications with a cloud-based server system 54, for example. The server system 54 may include various servers that store data that may be accessed by the system 10 for coordinating energy transfers between the electrified vehicle 12 and the one or more charging trailers 14 (and/or optionally the one or more electrified recreational/industrial vehicles 16). The telecommunications module 46 may communicate over a cloud network 56 (e.g., the internet) to obtain various information stored on the server system 54 or to provide information to the server system 54 that can subsequently be accessed by the electrified vehicle 12 (and/or other participating units of the system 10). The server system 54 can identify, collect, and store user data associated with the electrified vehicle 12 for validation purposes. Upon an authorized request, data may be subsequently transmitted to the telecommunications module 46 via one or more cellular towers 58 or some other known communication technique (e.g., Wi-Fi, Bluetooth®, data connectivity, etc.). The telecommunications module 46 can receive data from the server system 54 or can communicate data back to the server system 54 via the cellular tower(s) 58. Although not necessarily shown or described in this highly schematic embodiment, numerous other components may enable bidirectional communications between the electrified vehicle 12 and the server system 54.

In a first embodiment, a user/owner of the electrified vehicle 12 may interface with the server system 54 using the HMI 50. For example, the HMI 50 may be equipped with an application 64 (e.g., FordPass™ or another similar web-based application) for allowing users to interface with the server system 54. The HMI 50 may be located within a passenger cabin of the electrified vehicle 12 and may include various user interfaces for displaying information to the vehicle occupants and for allowing the vehicle occupants to enter information into the HMI 50. The vehicle occupants may interact with the user interfaces presentable on the HMI 50 via touch screens, tactile buttons, audible speech, speech synthesis, etc.

In another embodiment, the user/owner of the electrified vehicle 12 may alternatively or additionally interface with the server system 54 for coordinating functions of the system 10 using a personal electronic device 66 (e.g., a smart phone, tablet, computer, wearable smart device, etc.). The personal electronic device 66 may include an application 68 (e.g., FordPass™ or another similar application) that includes programming to allow the user to employ one or more user interfaces 70 for setting or controlling certain aspects of the system 10. The application 68 may be stored in a memory 72 of the personal electronic device 66 and may be executed by a processor 74 of the personal electronic device 66. The personal electronic device 66 may additionally include a transceiver 76 that is configured to communicate with the server system 54 over the cellular tower(s) 58 or some other wireless link.

The GPS 48 is configured to pinpoint locational coordinates of the electrified vehicle 12. The GPS 48 may utilize geopositioning techniques or any other satellite navigation techniques for estimating the geographic position of the electrified vehicle 12 at any point in time.

The control module 52 may include both hardware and software and could be part of an overall vehicle control system, such as a vehicle system controller (VSC), or could alternatively be a stand-alone controller separate from the VSC. In an embodiment, the control module 52 is programmed with executable instructions for interfacing with and commanding operations of various components of the system 10. Although shown as separate modules within the highly schematic depiction of FIG. 2, the telecommunications module 46, the GPS 48, the HMI 50, and the control module 52 could be integrated together as part of common module of the electrified vehicle 12.

The control module 52 may include a processor 78 and non-transitory memory 80 for executing various control strategies and modes associated with the system 10. The processor 78 may be a custom made or commercially available processor, a central processing unit (CPU), or generally any device for executing software instructions. The memory 80 may include any one or combination of volatile memory elements and/or nonvolatile memory elements.

The processor 78 may be operably coupled to the memory 80 and may be configured to execute one or more programs stored in the memory 80 of the control module 52 based on the various inputs received from other devices, such as the server system 54, the telecommunications module 46, the GPS 48, the HMI 50, the traction battery pack 28, the energy storage system 30 of each of the one or more charging trailers 14, the one or more electrified recreational/industrial vehicles 16, etc. In an embodiment, the application 64 (e.g., FordPass™ or another similar application), which includes programming for allowing the vehicle user to employ one or more user interfaces within the HMI 50 for setting or controlling certain aspects of the system 10, may be stored in the memory 80 and may be executed by the processor 78 of the control module 52. Alternatively or additionally, the control module 52 may be configured to communicate and interface with the personal electronic device 66 for coordinating and/or executing certain aspects of the system 10 through the application 68.

The control module 52 may receive and process various inputs for creating an energy transfer prioritization control strategy 82 for controlling the transfer of energy between each of the electrified vehicle 12 and the one or more charging trailers 14 (and/or optionally one or more electrified recreational/industrial vehicles 16). The energy transfer prioritization control strategy 82 may include, among other information, notifications, protocols, and level of priority for transferring or receiving energy at each energy unit (e.g., the traction battery pack 28 of the electrified vehicle 12 and the energy storage system 30 of each charging trailer 14) associated with the system 10 during energy transfer events.

A first input that may be analyzed by the control module 52 for developing the energy transfer prioritization control strategy 82 may include battery prognostic information 84 received from each energy unit of the system 10. The battery prognostic information 84 may include information such as current state of charge (SOC), estimated travel range, depth of discharge (DOD) mapping, internal resistance, current battery cell temperatures, and other battery metrics (e.g., voltage, current, battery size, battery type/chemistry, charge rate levels, charge acceptance levels, battery cell aging information, etc.) associated with the traction battery pack 28 of the electrified vehicle 12. Similar battery-related data may also be received from each energy storage system 30 of each connected charging trailer 14 (and optionally from each traction battery pack 36 of each connected electrified recreational/industrial vehicle 16 to the extent any are connected).

A second input that may be analyzed by the control module 52 for developing the energy transfer prioritization control strategy 82 may include trailer-specific information 86 associated with each connected charging trailer 14 of the system 10. The trailer-specific information 86 may include information such as weight capacity, current content weight, and other relevant physical attributes of each connected charging trailer 14 of the system 10.

A third input that may be analyzed by the control module 52 for developing the energy transfer prioritization control strategy 82 may include real-time prognostic information 88 received from various components/subsystems of the electrified vehicle 12. The real-time prognostic information 88 may include information such as current location of the electrified vehicle 12 (e.g., GPS coordinates, cellular triangulation coordinates, etc.), notable landmarks or services (e.g., nearby charging stations, energy storage unit, other trailers to bidirectional energy transfer enabled vehicles, etc.), real-time travel elements such as the current traveling speed of the electrified vehicle 12 (e.g., distance and time measurements), current estimated time of arrival to reach destination/waypoint, etc.

A fourth input that may be analyzed by the control module 52 for developing the energy transfer prioritization control strategy 82 may include environmental information 90 received from the server system 54 and/or the GPS 48. The environmental information 90 may include current weather information along the drive route, current traffic information along the drive route, physical route conditions (e.g., altitude/elevation conditions expected to be experienced along the drive route; received from the GPS 48), etc. Adverse traffic, weather, and/or physical route conditions can delay or slow the electrified vehicle 12 while traveling along the drive route and may therefore be important considerations that may affect the rate of charge when transferring charge energy during energy transfer events of the system 10.

A fifth input that may be analyzed by the control module 52 for developing the energy transfer prioritization control strategy 82 may include itinerary/calendar information 92 of the user associated with the electrified vehicle 12. The itinerary/calendar information 92 may include anticipated activity information such as upcoming drive routes planned by the user, frequently visited locations and expected arrival/departures times, home location and expected times parked at home location, scheduled activities of the user, etc. The itinerary/calendar information 92 may be received from the GPS 48 and/or from the server system 54 via the applications 64, 68. In an embodiment, an activity planner application of the personal electronic device 66 may be synced with the application 68 to provide an overall log of the user's anticipated activities in order to compliment the scheduled destination/waypoint indicated by the GPS 48. In another embodiment, the control module 52 may employ a neural network or machine learning techniques for inferring planned activities (e.g., learned driving habits or learned behaviors) that may occur during each planned drive route of the electrified vehicle 12.

A sixth input that may analyzed by the control module 52 for developing the energy transfer prioritization control strategy 82 may include a charge priority selection 95 that may be manually input by a user associated with the electrified vehicle 12. The charge priority selection 95 may identify the user's desired order of charge priority when transferring energy to the various energy units of the system 10.

Figure 3:
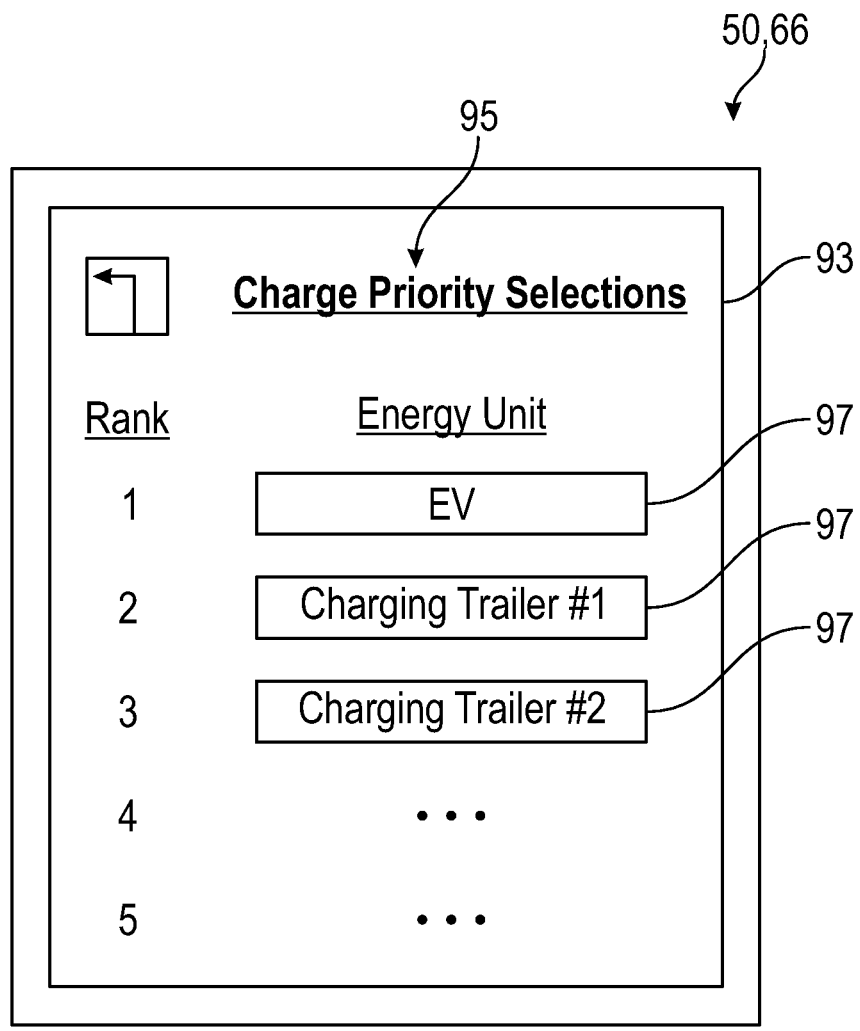
FIG. 3 schematically illustrates a user interface associated with a bidirectional energy transfer system.

The charge priority selection 95 may be received as an input to the system 10 via a user interface 93 associated with the HMI 50 and/or the personal electronic device 66 (see, e.g., FIG. 3). The user interface 93 may list each detected energy unit of the system 10. A tile 97 may be associated with each confirmed energy unit of the system 10. The user may rearrange the tiles 97 within the user interface 93 in order to select the priority level by which each respective energy unit of the system 10 is to receive charge energy from the other energy units of the system 10 during bidirectional energy transfer events. Other configurations are also contemplated within the scope of this disclosure by which the user can input the charge priority selection 95 for receipt and analysis by the control module 52.

A seventh input that may be analyzed by the control module 52 for developing the energy transfer prioritization control strategy 82 may include recreational/industrial vehicle-specific information 85 associated with each connected electrified recreational/industrial vehicle 16 of the system 10. The recreational/industrial vehicle-specific information 85 may include information such various relevant physical attributes of each connected electrified recreational/industrial vehicle 16 of the system 10 (to the extent any are connected).

The inputs referenced above are intended to be exemplary only. Various other inputs could be considered by the control module 52 for developing the energy transfer prioritization control strategy 82 described herein.

In response to receiving and analyzing the various input signals, the control module 52 may prepare the energy transfer prioritization control strategy 82. The energy transfer prioritization control strategy 82 may include the instructions, protocols, etc. necessary for executing energy transfers between the energy units of the system 10 according to the desired priority order indicated by the manually inputted charge priority selection 95.

The control module 52 may further be programmed to examine various factors for determining whether any incompatibilities exist within the system 10 that could prevent/inhibit bidirectional energy transfers from taking place in the manner indicated by the charge priority selection 95. These factors may include comparisons of the available energy and the predicted energy needs of each energy unit, the functional status of each electrified unit of the system 10 (e.g., error states that indicate that energy transfer to a respective energy unit of the system 10 could be inhibited), real-time energy requirements of each energy unit (e.g., updated prediction accuracy of energy required to complete drive route to destination/waypoint), physical/performance limitations of each energy unit of the system 10 (e.g., limitations that could arise from battery management thresholds such as thermal limitations, reduced charge acceptance, etc. of the traction battery pack 28 and/or each energy storage system 30), conflicting user preference settings associated with the system 10, etc. These factors are intended to be exemplary only. Various other factors could be considered by the control module 52 for determining whether incompatibilities exist within the system 10.

The control module 52 may also be programmed to command that one or more messages be displayed on the HMI 50 and/or the personal electronic device 66. For example, the control module 52 may also be configured to command that a message or alert be displayed on the HMI 50 and/or the personal electronic device 66 when the current energy requirements of any of the electrified units of the system 10 are unable to be met under the current energy transfer conditions.

The control module 52 may further be programmed to communicate/interface with the various energy units of the system 10 in order to execute the energy transfer prioritization control strategy 82. For example, the energy transfer prioritization control strategy 82 may indicate how much (including charge rate), if any, and when charge energy should be transferred from the energy storage systems 30 of the charging trailers 14 to the traction battery pack 28 of the electrified vehicle 12 and/or to the energy storage systems 30 of other charging trailers 14, and how much, if any, and when charge energy should be transferred from the traction battery pack 28 of the electrified vehicle 12 to the energy storage system 30 of the one or more charging trailers 14. The control module 52 may therefore interface with and control the functionality of the bidirectional power transfer system 40 (e.g., by opening/closing contactors, performing step-up or step-down power conversions, performing power inversions, etc.) and any other related systems/subsystems for coordinating and providing prioritized energy transfers to the respective energy units of the system 10 during energy transfer events.

Figure 4:
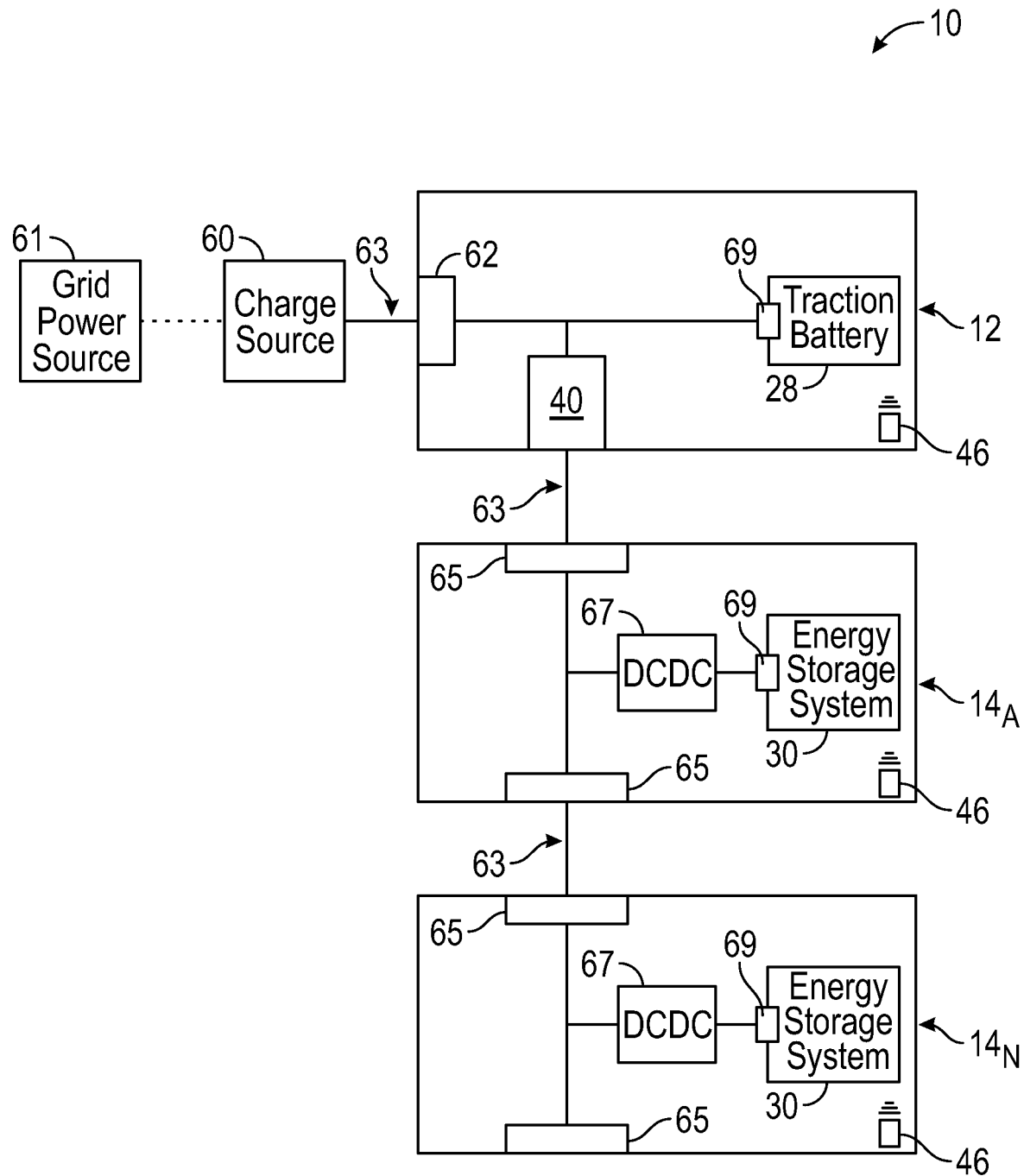
FIG. 4 schematically illustrates an exemplary power flow topology of a bidirectional energy transfer system.

Referring now to primarily to FIG. 4, the system 10 may be operably coupled to a charge source 60 in some implementations, such as during energy transfer events that occur while the structures of the system 10 are stationary or not "in-flight." The charge source 60 may be a public charging station, a DC fast charging station, a home charging station, a wall box, or any other type of charge source. The charge source 60 may be operably coupled to a grid power source 61 (e.g., AC power, solar power, wind power, or combinations thereof). The charge source 60 may therefore provide the interface for charging the energy units of the system 10 using power supplied by the grid power source 61.

The electrified vehicle 12 may be equipped with a charge port assembly 62 that is configured to receive energy from the charge source 60. A charging cable 63 may be used to connect the charge source 60 to the charge port assembly 62.

Each charging trailer 14 may be equipped with two or more charge port assemblies 65. Two or more charge port assemblies 65 may be provided such that each charging trailer 14 of the system 10 may be configured to send/receive charge energy to/from an upstream energy unit and/or a downstream energy unit of the system 10.

Additional charging cables 63 may be used to operably connect the charging trailers 14 to one another and to the electrified vehicle 12 and thus the charge source 60. The charging cables 63 may be arranged in a daisy-chain configuration for transferring energy during bidirectional energy transfer events.

As referenced above, the bidirectional power transfer system 40 may be controlled to allow energy transfers to/from downstream energy units of the system 10. Each charging trailer 14 may also be equipped with a DC-DC converter 67 that is configured to perform various functions during energy transfers, such as performing step-up or step-down power conversions, controlling the direction of power transfer to/from the energy storage unit 30, etc.

The system 10 may determine what energy units are connected to the electrified vehicle 12 in various ways in order for enabling proper bidirectional power flow. In an embodiment, the user may manually specify what energy units are connected by leveraging various user interfaces of the HMI 50 and/or the personal electronic device 66. In another embodiment, each charge port assembly 62, 65 may be equipped with various sensors that are capable of detecting when connections are made and then communicating with the control module 52 in response thereto. In yet another embodiment, the electrified vehicle 12 and the charging trailers 14 are capable of wirelessly communicating with one another via telecommunications modules 46 that can be provided on each subunit of the system 10. In such an embodiment, a contactor system 69 of each charging trailer 14 and of the traction battery pack 28 may be turned on/off to determine where power is flowing within the system 10. The power flow information may then be wirelessly transmitted between the various subunits of the system 10 via the telecommunications modules 46.

Figure 5:
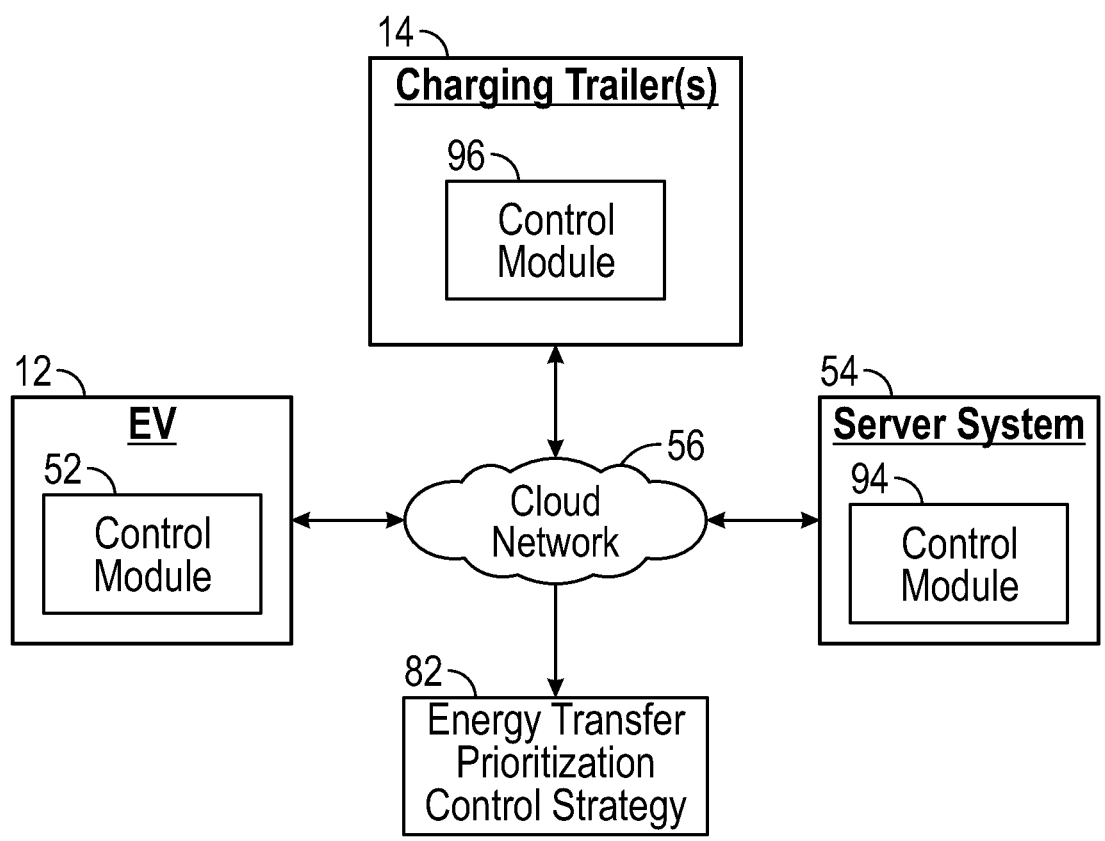
FIG. 5 schematically illustrates a control system of another exemplary bidirectional energy transfer system.

In the embodiments described above, the control module 52 of the electrified vehicle 12 may be configured to function as the communications hub of the system 10. However, other embodiments are also contemplated within the scope of this disclosure. For example, as schematically shown in FIG. 5, a control module 94 of the server system 54 (e.g., a cloud-based control module) or a control module 96 associated with one or more connected charging trailers 14 could be configured to function as the communications hub of the system 10. In yet another embodiment, the respective control modules of each of the electrified vehicle 12, the one or more charging trailers 14, and the server system 54 may operate together over the cloud network 56 to establish a control system for preparing the energy transfer prioritization control strategy 82 and for ultimately controlling the energy transfer prioritizations afforded by the system 10.

Figure 6:
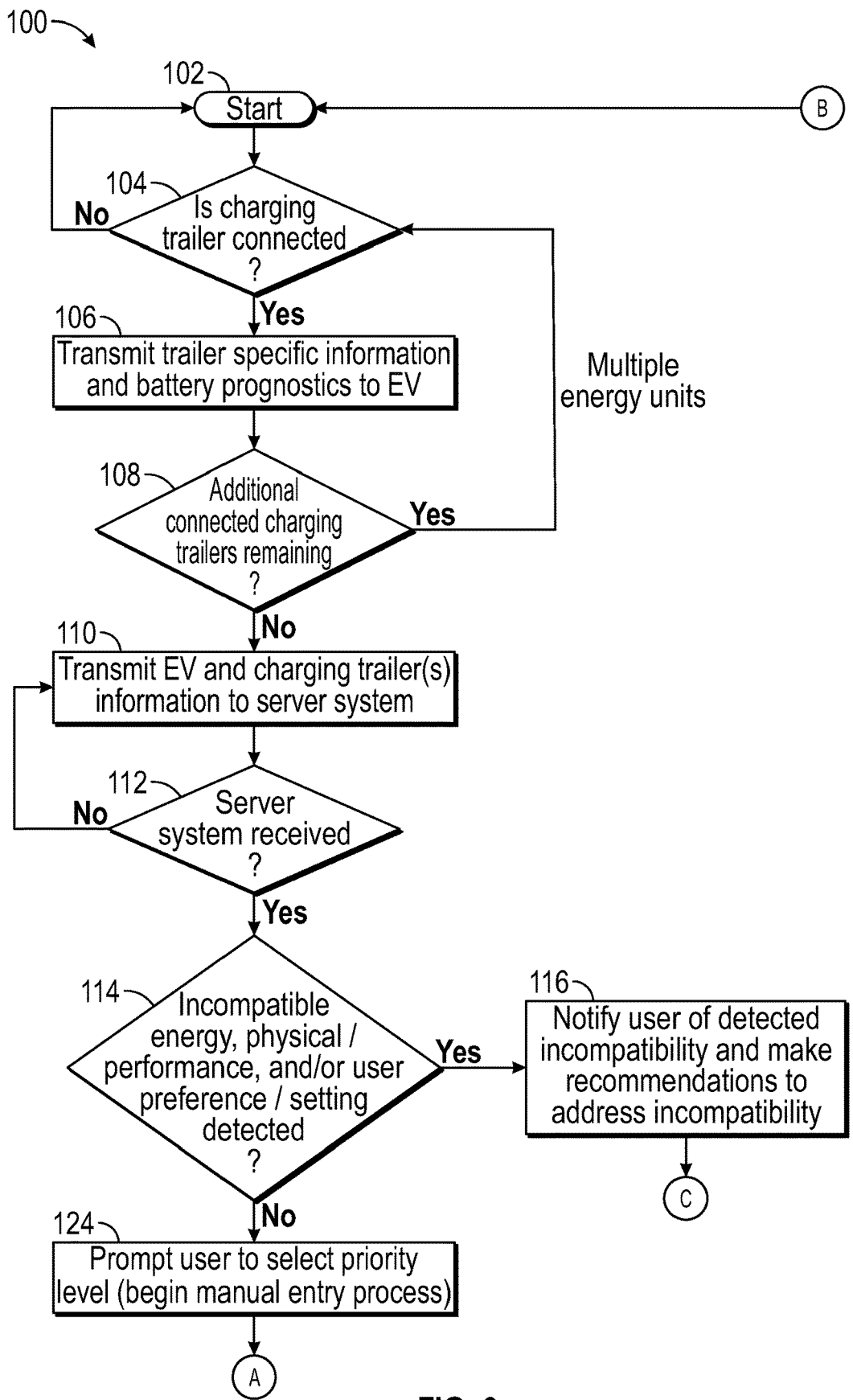
FIG. 6 is a flow chart of an exemplary method for coordinating and controlling prioritized bidirectional energy transfers between an electrified vehicle and one or more charging trailers of a bidirectional energy transfer system.
Figure 6:
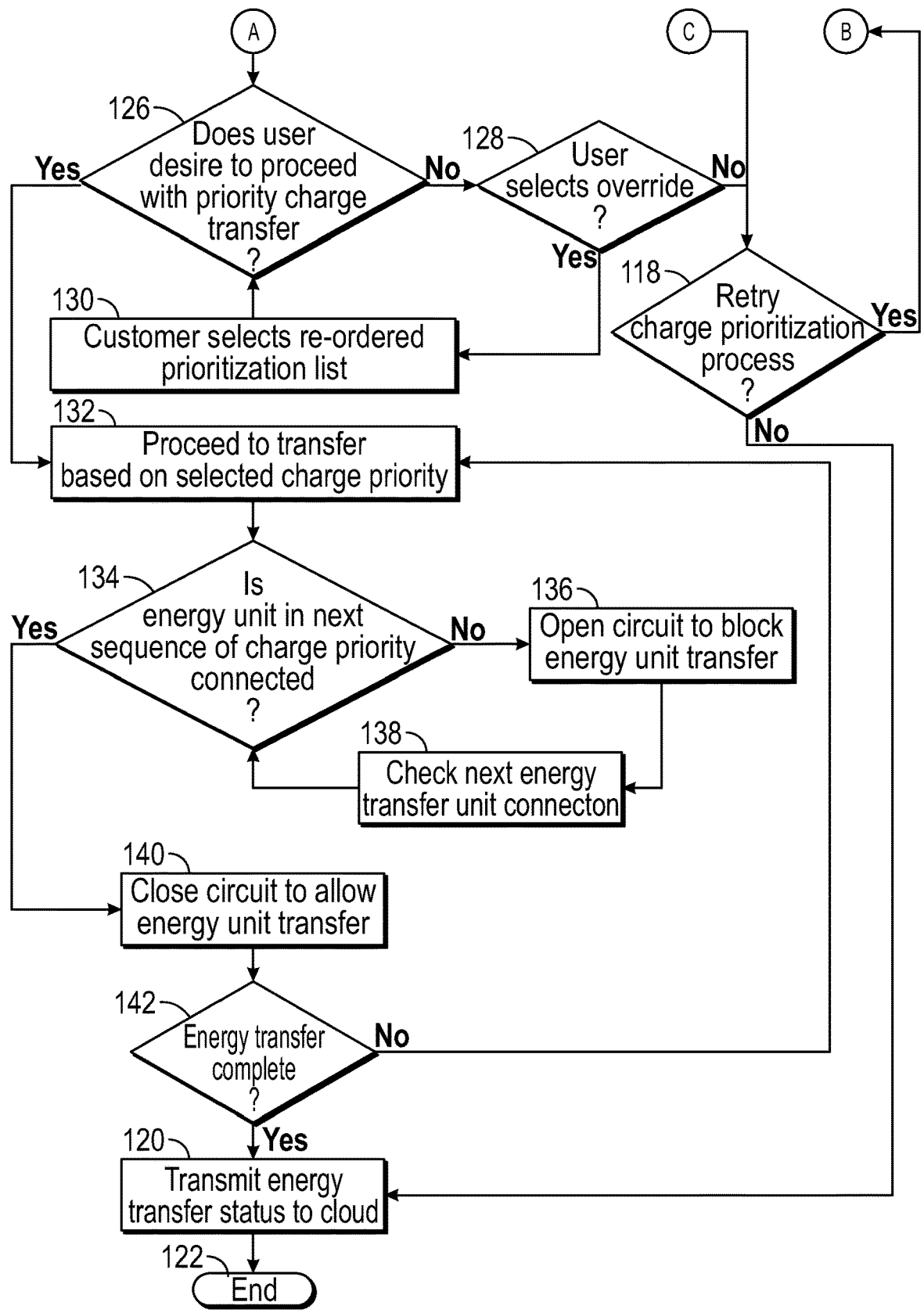

FIG. 6, with continued reference to FIGS. 1-5, schematically illustrates in flow chart form an exemplary method 100 for creating and executing the energy transfer prioritization control strategy 82 of the system 10. Per the method 100, the energy transfer prioritization control strategy 82 may be executed to provide energy transfers between the electrified vehicle 12 and the one or more charging trailers 14 that are prioritized according to the specific priority selections that may be manually entered by a user of the system 10.

The system 10 may be configured to employ one or more algorithms adapted to execute at least a portion of the steps of the exemplary method 100. For example, the method 100 may be stored as executable instructions in the memory 80 of the control module 52, and the executable instructions may be embodied within any computer readable medium that can be executed by the processor 78 of the control module 52. The method 100 could alternatively or additionally be stored as executable instructions in the memories of comparable control modules of the one or more charging trailers 14 and/or the server system 54.

The exemplary method 100 may begin at block 102. At block 104, the method 100 may determine whether one or more charging trailers 14 are connected to the electrified vehicle 12. If YES, the method 100 may proceed to block 106 by transmitting the trailer-specific information 86 and the battery prognostic information 84 from each charging trailer 14 to the control module 52 of the electrified vehicle 12.

Next, at block 108, the method 100 may confirm whether any connected charging trailers 14 remain that have not been accounted for. If a NO flag is returned, the method 100 may proceed to block 110. At block 110, various information from the electrified vehicle 12 and from each connected charging trailer 14 may be transmitted to the server system 54 for further analysis. The information transmitted to the server system 54 may include, but is not limited to, battery prognostic information 84, the trailer-specific information 86, the real time prognostic information 88, etc. The method 100 may confirm that the information has been received by the server system 54 at block 112. If YES, the method 110 may proceed to block 114.

At block 114, the method 100 may determine whether any incompatible functional requirement, energy requirement, physical performance requirement, and/or user preference/setting has been detected. This may include accounting for available grid power until time of departure to calculate the total energy supply of the electrified vehicle 12. If YES, the method 100 proceeds to block 116. At this step, the method 100 may notify the user of any detected incompatibilities and provide recommendations for fixing the incompatibilities. The method 100 may then receive indication from the user whether or not to retry the charge prioritization process at block 118. If YES, the method may return to block 102. If NO, the method may proceed to block 120 by saving the actual energy transfer measurements to the cloud. The method 100 may then end at bock 122.

Alternatively, if a NO flag is returned at block 114, the method 100 may instead proceed to block 124. At block 124, the user may be prompted to select his/her desired priority levels for transferring charge energy during energy transfer events. This step may include prompting the user to input the charge priority selection 95 within the user interface 91, for example.

The method 100 may confirm that the user wishes to proceed with a prioritized charge energy transfer at block 126. If NO, the method 100 may confirm whether the user has selected a priority override at block 128. If YES, the method 100 may receive a user input of the re-ordered prioritization at block 130. The method 100 may instead proceed to block 118 (discussed above) if the user has not selected an override at block 128. Alternatively, if a YES flag is returned at block 126, thus indicating that the user is satisfied with the charge priority selection 95, the method 100 may proceed with the selected prioritized energy transfer at block 132.

Next, a block 134, the method 100 may confirm whether the energy unit in the next sequence of charge priority according to the charge priority selection 95 is connected to the system 10. If NO, the charge circuit is opened (e.g., by controlling the bidirectional power transfer system 40) to block energy transfer to the energy unit at block 136. The user may then be prompted to address the energy unit connection at block 138. Alternatively, if a YES flag is returned at block 134, the charge circuit may be opened (e.g., by controlling the bidirectional power transfer system 40) to allow energy transfer between the electrified vehicle 12 and the respective energy unit at block 140.

The method 100 may confirm whether the energy transfer is complete at block 142. The actual energy transfer measurements performed may be saved to the cloud at block 120 when the transfer is confirmed as being completed. The method 100 may then end at bock 122.

The bidirectional energy transfer systems of this disclosure are designed to coordinate and control, based manually entered user inputs, power flow during energy transfer events between an electrified vehicle and one or more charging trailers that are operably coupled to the electrified vehicle. The systems and methods may prioritize energy transfers between each connected energy unit of the system based on various input parameters in order to enable closed-loop energy transfer feedback, and for addressing charge uniformity and battery thermal issues from competing battery thermal management systems. The proposed systems and methods may better manage energy flow between the connected energy units for achieving streamlined decision making during bidirectional energy transfers.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A bidirectional energy transfer system, comprising:
   an electrified vehicle;
   a charging trailer operably coupled to the electrified vehicle; and
   a control module programmed to execute an energy transfer prioritization control strategy for controlling a transfer of energy between the electrified vehicle and the charging trailer during an energy transfer event,
   wherein the energy transfer prioritization control strategy is derived based on a charge priority selection that is manually input by a user of the system.

2. The system as recited in claim 1, comprising an electrified recreational/industrial vehicle operably coupled to the charging trailer.

3. The system as recited in claim 2, wherein the control module is further programmed to control a transfer of energy from at least one of the charging trailer or the electrified vehicle to the electrified recreational/industrial vehicle during the energy transfer event.

4. The system as recited in claim 2, wherein the control module is further programmed to control a transfer of energy from at least one of the charging trailer or the electrified recreational/industrial vehicle to the electrified vehicle during the energy transfer event.

5. The system as recited in claim 1, wherein the control module is further programmed to interface with a bidirectional power transfer system of the electrified vehicle for controlling the transfer of the energy between the charging trailer and the electrified vehicle according to the energy transfer prioritization control strategy.

6. The system as recited in claim 1, wherein the control module is a component of the electrified vehicle or a cloud-based server system.

7. The system as recited in claim 1, comprising a user interface adapted to receive a user input of the charge priority selection from the user.

8. The system as recited in claim 7, wherein the user interface is presentable on a human machine interface or a personal electronic device that is associated with the system.

9. The system as recited in claim 1, wherein the control module is further programmed to command a notification to the user when the system is unable to transfer the energy in the manner indicated by the energy transfer prioritization control strategy.

10. The system as recited in claim 9, wherein the notification is presented on a user interface of a human machine interface or a personal electronic device associated with the system.

11. An electrified vehicle, comprising:
a traction battery pack; and
a control module programmed to execute an energy transfer prioritization control strategy for controlling a transfer of energy from the traction battery pack to a separate energy unit or from the separate energy unit to the traction battery pack during an energy transfer event,
wherein the energy transfer prioritization control strategy is derived based on a charge priority selection that is manually input by a user of the electrified vehicle.

12. The electrified vehicle as recited in claim 11, wherein the charge priority selection indicates a desired order of charge priority when transferring the energy to/from the traction battery pack.

13. The electrified vehicle system as recited in claim 11, wherein the control module is further programmed to interface with a bidirectional power transfer system for controlling the transfer of the energy to/from the traction battery pack.

14. The electrified vehicle system as recited in claim 11, wherein the separate energy unit is a component of a charging trailer.

15. The electrified vehicle as recited in claim 11, wherein the separate energy unit is a component of an electrified recreational/industrial vehicle.

16. The electrified vehicle system as recited in claim 11, comprising a human machine interface that is configured via a user interface to allow the user to manually input the charge priority selection.

17. The electrified vehicle system as recited in claim 16, wherein the user interface includes a plurality of tiles that are configured to be manipulated to reorder a priority ranking of the traction battery pack and the separate energy unit.

18. The electrified vehicle system as recited in claim 11, comprising a telecommunications module configured to wirelessly communicate with the separate energy unit.

19. The electrified vehicle system as recited in claim 11, wherein the control module is further programmed to prompt the user to input the charge priority selection in anticipation of the energy transfer event.

20. The electrified vehicle system as recited in claim 19, wherein the control module is further programmed to receive an input from the user indicating that the charge priority selection has been manually input.

* * * * *